United States Patent  [15] 3,653,472
Dowell  [45] Apr. 4, 1972

[54] DISC BRAKES
[72] Inventor: Frederick S. Dowell, Coventry, England
[73] Assignee: The Dunlop Company Limited, Birmingham, England
[22] Filed: Sept. 30, 1970
[21] Appl. No.: 76,660

[52] U.S. Cl............................188/217, 188/72.4, 192/70.17
[51] Int. Cl.......................................................F16d 55/12
[58] Field of Search...............................188/72.4, 73.5, 217; 192/70.17, 106.1

[56] References Cited

UNITED STATES PATENTS

| | | | |
|---|---|---|---|
| 2,850,124 | 9/1958 | Grote | 188/217 X |
| 3,300,007 | 1/1967 | Motsch | 192/70.17 |
| 3,340,967 | 9/1967 | Farr et al. | 188/217 X |

Primary Examiner—Duane A. Reger
Attorney—Jeffers and Young

[57] ABSTRACT

In an aircraft brake a brake thrust transmission member is arranged between a stack of friction members and a circular arrangement of spaced brake actuators to provide even circumferential distribution of the localised thrusts exerted by the actuators. The transmission member has at least one deformable section of frusto-conical shape, an annular ring engaged by the actuators, and another annular ring, which may have two or more co-planar surfaces, for engagement with a friction member.

26 Claims, 6 Drawing Figures

DISC BRAKES

This invention relates to disc brakes and in particular, though not exclusively, to heavy-duty disc brakes for use in aircraft. The invention also provides a disc brake suitable for use as a clutch.

It is known in heavy-duty brakes comprising an assembly of interleaved rotor and stator members mounted for axial movement into frictional engagement with each other, to provide a plurality of circumferentially spaced piston and cylinder assemblies on one side of the assembly of rotor and stator members to exert a thrust on one of the two outermost stator members by direct engagement therewith and thereby force the assembly of rotor and stator members against a fixed annular stop.

A disadvantage of the construction referred to in the last preceding paragraph is that the stator member to which the thrust from the piston and cylinder assemblies is directly applied tends, in use, to deform. The stator member deforms generally sinusoidally, the apices in the thus-formed curves being where the thrust from the piston and cylinder assemblies is applied to the stator member. The result of this deformation is that the brake-applying thrust forcing the stator member into engagement with its respective rotor member varies appreciably around the circumference of the stator member. In consequence the friction set up between the rotor and stator members is less than is desired, the stator experiences high thermal stress and distorts further under the influence of localized high temperature regions set up, and since the "hot spots" on the stator member are where the pistons engage the stator, the pistons are themselves excessively heated. This causes problems not only in relation to the pistons but also in relation to the seals and hydraulic fluid used in association therewith. Stiffening of the axially innermost stator member by increasing its thickness is not a practicable solution to the problem because to ensure adequate stiffness the stator member has to be too bulky and heavy for normal usage.

It is an object of the invention to provide a brake in which the problems referred to above are mitigated or overcome.

According to the invention, a disc brake comprises a pair of friction members rotatable relative to each other and mounted for movement into frictional engagement with each other, a plurality of brake actuators located at spaced-apart positions for applying a brake actuating force to one of the friction members, and thrust transmission means for transmitting thrust from the actuators to the respective friction member, the thrust transmission means comprising two concentric annuli of differing diameters interconnected by deformable connecting means, whereby a brake-applying force applied by the brake actuators to one of the annuli is transmitted to the other annulus through the deformable connecting means.

Preferably the two annuli of the thrust transmission means are axially spaced.

Five embodiments of the invention will now be described by way of example, with reference to the accompanying diagrams in which.

Figure 1:
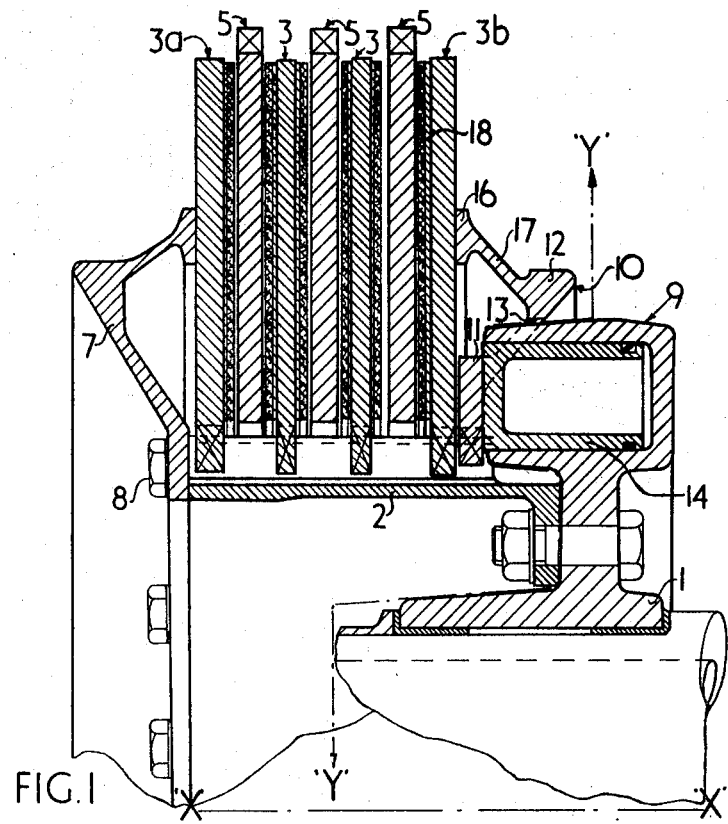
FIG. 1 is a sectional elevation of half a brake assembly, in a plane parallel to and coincident with the axis X—X about which the brake assembly is symmetrical.

A disc brake (illustrated in FIGS. 1 and 2) comprises a non-rotatable annular hub 1 having secured thereto a torque tube 2. An assembly of annular stator members, 3, 3a and 3b, are axially slidably keyed, each at its radially inner periphery, to splines 4 on the torque tube 2. A corresponding series of annular rotor members 5 are interleaved with the stator members 3 and axially slidably keyed, each at its radially outer periphery 6 to a wheel for rotation therewith.

At one end of the torque tube 2 an annular flange 7 is secured thereto by 12 bolts 8 for engagement with the axially outermost stator member 3a, to constitute a stop therefor.

Twelve brake actuators 9 in the form of piston and cylinder assemblies are mounted at equally circumferentially spaced positions at the other end of the torque tube 2 for applying a brake-actuating thrust to the axially innermost stator member 3b.

Thrust transmission means 10 for transmitting thrust from the actuators 9 to the axially innermost stator member 3b is provided. The thrust transmission means comprises first and second concentric and axially spaced metal annuli (11,12) interconnected by a deformable first connecting means 13 in the form of a frusto-conical metal web having an included apex angle of at least 90°. The thickness of the material of the web is as thin as possible, consistent with the loads which the web is required to transmit when the maximum braking thrust is applied.

The piston 14 of each piston and cylinder assembly is arranged to engage the first annulus 11 to transmit thrust thereto. Semi-circular openings 15, one for each piston and cylinder assembly, are formed in the web at the radially inner edge thereof to allow the respective portion of each piston and cylinder assembly to extend therethrough for unimpeded engagement of the piston with the first annulus 11.

The first annulus 11 is axially slidably keyed at its radially inner periphery to the splines on the torque tube 2 and thereby maintains the web in spaced angular relationship to the piston and cylinder assemblies.

The second annulus 12 is connected to a third annulus 16 in engagement with the axially innermost stator member 3b, by a deformable second connecting means 17 of similar construction to the first connecting means.

The third annulus 16 engages the axially innermost stator member 3b at a radial position intermediate between the inner radius and the outer radius of the friction pad 18 of the stator member such that the distributed pressure over the surface of the friction pad causes no rolling moment on the stator member about the line of engagement with the third annulus. This ensures that there is no conical distortion of the stator member and that, for a stator member of a particular radial rigidity, there is a maximum uniformity of wear over the radial width of the friction pad.

The three annuli and their respective connecting means are, considered in radial cross-section, arranged in V-formation the third annulus 16 being in engagement with the axially innermost stator member 3b, the first annulus 11 standing proud thereof.

In normal operation, fluid at a high pressure is supplied to alternate brake actuators 9 to apply the brake. The six other brake actuators are for emergency use in the case of failure of the first six such assemblies. The thrust generated by each brake actuator is transmitted from the first annulus 11 which is engaged by the pistons 14, to the second annulus 12 solely through the first connecting means 13, and between the second and third annuli 12 and 16 solely through the second connecting means 17. The two connecting means deform slightly under the thrust exerted by the piston and cylinder assemblies, the first annulus moving a short distance towards the axially innermost stator member but not engaging it. This deformation has the effect of equalizing the brake-applying thrust around the circumference of the axially innermost stator member so that the thrust exerted thereon by the third annulus is substantially uniform around the circumference thereof.

Figure 3:
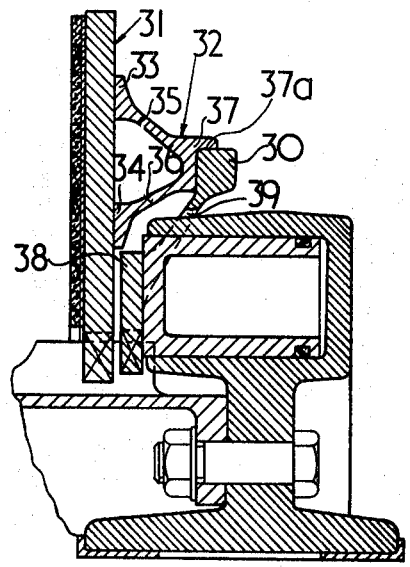
FIG. 3 shows a sectional elevation of a second embodiment of the invention.

In a second embodiment of the invention, illustrated in FIG. 3 and otherwise similar to the embodiment described above, the brake-applying force is transmitted from the second annulus 30 to the axially innermost stator member 31 through a thrust ring 32 extending around the circumference of the stator member. The thrust ring is generally V-shaped in radial cross-section, the ends 33,34 of the two limbs 35,36 of the V being in contact with the stator member and the apex 37 of the V standing proud thereof in engagement with the second annulus. The ends of the limbs of the V and the apex thereof are thickened to receive and transmit brake-applying thrusts, and an annular recess 37a is formed in the thickened apex region to receive and locate the second annulus 30.

The mode of operation of the brake is similar to that of the first embodiment. Brake-applying thrust generated by the brake actuator is transmitted directly to the first annulus 38, through the connecting means 39 to the second annulus 30 and is from thence applied to the axially innermost stator member by the thrust ring.

It will be noted that whereas in the first embodiment, brake-applying thrust is transmitted to the respective stator member by the third annulus around the circumference thereof over a single annular area, in the second embodiment the thrust is applied to the stator member in two radially spaced annular bands. This improves the thrust distribution over the radial width of the stator member and thereby allows either a greater uniformity of wear over the radial width of the friction pad of a stator member of a particular rigidity or, a reduction in the rigidity and weight of the stator member without a reduction in the uniformity of wear over the radial width of the friction pad.

Figure 4:
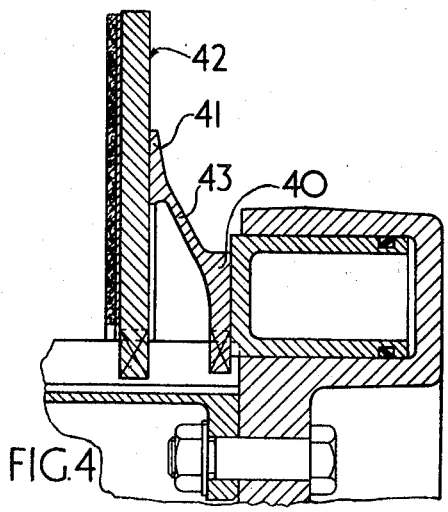
FIG. 4 shows a sectional elevation of a third embodiment of the invention.

In a third embodiment of the invention, illustrated in FIG. 4 and otherwise similar to the first embodiment, the brake-applying thrust is transmitted from the first annulus 40 to a second annulus 41 adjacent the stator member 42 by means of a single deformable connecting means 43 of frusto-conical shape.

Figure 5:
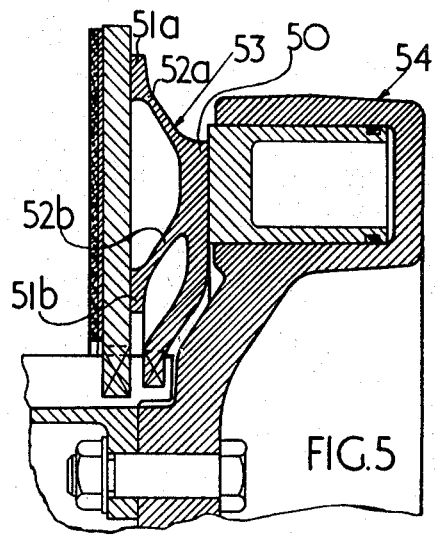
FIG. 5 shows a sectional elevation of a fourth embodiment of the invention.

In a fourth embodiment of the invention, illustrated in FIG. 5 and otherwise similar to the first embodiment, the brake-applying thrust is transmitted from a first annulus 50 to an outer second annulus 51a by means of an outer connecting means 52a and to an inner second annulus 51b by means of an inner connecting means 52b, both connecting means being deformable and of frusto-conical shape. The transmission means is secured in angular relationship to the brake actuators 54 by means of the first annulus which extends radially inward and is axially slidably keyed to the splined torque tube.

It will be noted that, as in the arrangement of the second embodiment, brake-applying thrust is transmitted to the respective stator member over two radially spaced annular bands, and this improves the thrust distribution over the radial width of the stator member.

Figure 6:
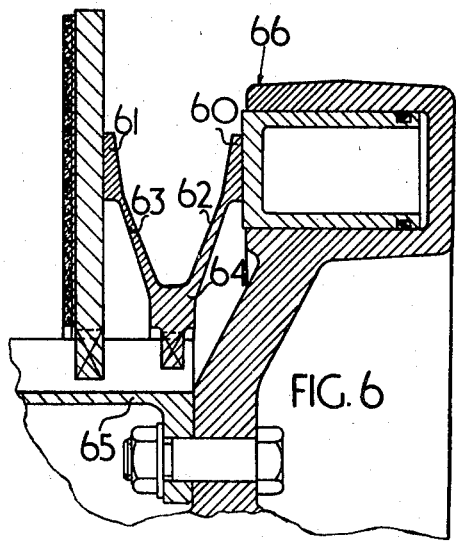
FIG. 6 shows a sectional elevation of a fifth embodiment of the invention.

In a fifth embodiment of the invention, illustrated in FIG. 6 and otherwise similar to the first embodiment, the brake-applying thrust is transmitted from a first annulus 60 to a third annulus 61 by means of two deformable connecting means 62,63 arranged to deflect in series with each other. A second annulus 64, axially slidably keyed at its radially inner periphery to the splines on the torque tube 65, serves to connect the two connecting means which are each of a frusto-conical shape and to locate the transmission means in angular relationship to the brake actuators 66.

The extent to which the localised thrust loading of the first annulus by the brake actuators in a brake according to the invention is transformed into a circumferentially uniform thrust at the second annulus is related to the radial width of the connecting means linking these two annuli. In general the greater the width of the connecting means, the more circumferentially even the thrust transmitted to the second annulus. However it is of course essential for the connecting means to be able to transmit the maximum braking load, and from this point of view it is preferable for the connecting means to be conical in form, the first and second annuli thus being both concentric and axially spaced. In the case of a connecting means for use in an aircraft brake it is the full emergency rejected take-off braking load which is the maximum braking load to be transmitted. If desired, the first annulus and the connecting means may be in the form of a spider. Furthermore, it is not essential for the connecting means to be integrally formed with the material of the annuli, a free location of the connecting means to at least one of the annuli being feasible.

Figure 2:
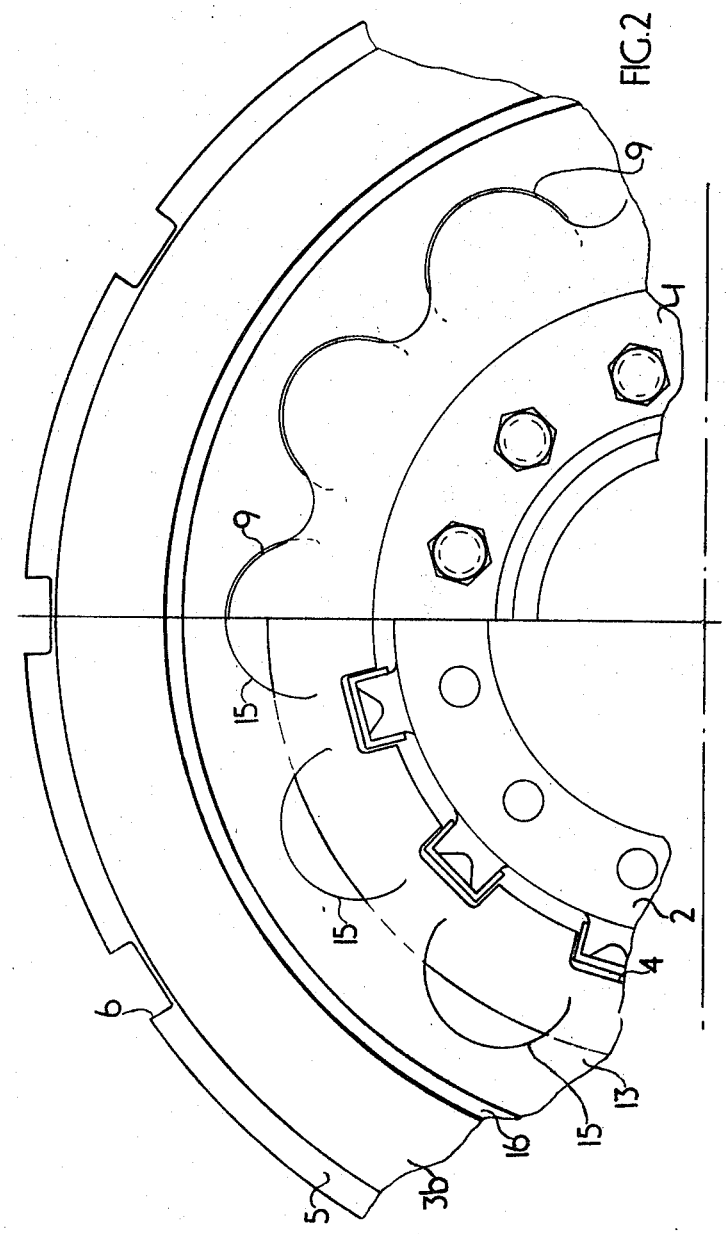
FIG. 2 is an end elevation of the brake assembly shown in FIG. 1, the left hand half being a section on Y—Y to show the brake assembly with the brake actuators removed.

In previously proposed heavy duty brakes, the brake-actuating piston and cylinder assemblies have been arranged in a common pitch circle in axial and radial alignment with the annular friction members of the brake. It is a significant feature of the present invention that the fluid-operated brake-actuating piston and cylinder assemblies may be located radially inwardly of the annular zone at which the brake-actuating thrust is applied to the axially innermost stator member. This feature of the invention, as illustrated in FIGS. 1, 2 and 3, leads to a compact, stiff and robust form of the brake which is particularly suitable for aircraft brakes. For use in aircraft, the saving in weight associated with this compact form of brake is particularly important.

It is to be noted that by use of a thrust member having a suitable configuration, as in FIG. 4 and FIG. 5, the piston and cylinder assemblies may, if desired, be radially and axially aligned with the annular thrust zone of the stator member.

More generally, in a transmission means of the kind described, the radius of the pitch circle on which the piston and cylinder assemblies are located can be chosen independently of the location of the annular zone at which thrust is applied to the axially innermost stator member. This provides scope for improved cylinder block design.

While in the embodiments described above the disc brake according to the invention is primarily intended for use as an aircraft wheel brake a brake of this kind can also be arranged to operate as a clutch.

Having now described my invention - what I claim is:

1. A disc brake comprising a pair of friction members rotatable relative to each other and mounted for movement into frictional engagement with each other, a plurality of brake actuators located at spaced-apart positions for applying a brake actuating force to one of the frictional members, and thrust transmission means for transmitting thrust from the actuators to the respective friction member, the thrust transmission means comprising two concentric annuli of differing diameters inter-connected by deformable connecting means, whereby a brake-applying force applied by the actuators to one of the annuli is transmitted to the other annulus through the deformable connecting means.

2. A disc brake according to claim 1 wherein the thrust transmission means comprises a first annulus and a second annulus axially spaced relative to each other.

3. A disc brake according to claim 1 wherein the thrust transmission means comprises a first annulus and a second annulus inter-connected by a deformable connecting means of frusto-conical shape.

4. A disc brake according to claim 1 wherein a first annulus is arranged to transmit brake actuating thrust from the brake actuators through the connecting means to a second annulus adjacent a friction member.

5. A disc brake according to claim 1 wherein the thrust transmission means comprises an inner second annulus and an outer second annulus respectively connected to a first annulus by means of an inner deformable connecting means and an outer deformable connecting means.

6. A disc brake according to claim 5 wherein the diameter of the outer connecting means is greater adjacent the outer second annulus than adjacent the first annulus, and the diameter of the inner connecting means is greater adjacent the inner second annulus than adjacent the first annulus.

7. A disc brake according to claim 1 wherein the thrust transmission means comprises three concentric annuli and two connecting means, at least one connecting means being deformable.

8. A disc brake according to claim 7 wherein a first annulus is connected by a first deformable connecting means to a second annulus, the second annulus being connected by a second deformable connecting means to a third annulus adjacent a friction member.

9. A disc brake according to claim 7 wherein a first annulus is connected by a deformable first connecting means to a second annulus, the second annulus engaging a second connecting means arranged in the form of an annular thrust ring.

10. A disc brake according to claim 9 wherein the thrust ring comprises at least two annuli engagement with a friction member.

11. A disc brake according to claim 10 wherein the thrust ring is generally V-shaped in radial cross-section, the ends of the two limbs of the V being formed with the two annular surfaces being an inner third annulus and an outer third annular adjacent the friction member, and the apex of the V standing proud thereof.

12. A disc brake according to claim 11 wherein the apex region of the thrust ring is thickened to receive and transmit brake-applying thrusts.

13. A disc brake according to claim 12 wherein the apex region of the thrust ring is provided with an annular recess to receive the second annulus.

14. A disc brake according to claim 8 wherein the second annulus is the annulus furthest from the friction member adjacent the third annulus.

15. A disc brake according to claim 14 wherein openings, one for each brake actuator, are formed in the first connecting means such that the piston of each brake actuator may extend therethrough for engagement with the first annulus.

16. A disc brake according to claim 8 wherein the first annulus is the annulus furthest from the friction member adjacent the third annulus.

17. A disc brake according to claim 1 wherein an annulus is formed as part of the material of a deformable connecting means.

18. A disc brake according to claim 1 wherein an annulus is connected rigidly or otherwise to a deformable connecting means.

19. A disc brake according to claim 1 wherein a deformable connecting means is in the form of a spider.

20. A disc brake according to claim 1 wherein the pressure applied by the thrust transmission means to a friction member acts on the friction member at an effective radius intermediate between the inner radius and the outer radius of the friction pad of the friction member such that the distributed pressure over the surface of the friction pad causes no rolling moment on the friction member about the effective line of engagement with the thrust transmission means.

21. A disc brake according to claim 1 wherein the piston of each brake actuator is located radially inward of the effective radius at which brake-applying thrust is applied to a friction member.

22. A disc brake according to claim 1 wherein the piston of each brake actuator is located at the same radius as the effective radius at which brake-applying thrust is applied to a friction member.

23. A disc brake according to claim 2 wherein the thrust transmission means is located in angular relationship to the brake actuators by means of one annulus axially slidably mounted and keyed at its radially inner periphery so as to engage splines on a torque tube, the torque tube being secured to a hub on which the plurality of brake actuators is mounted.

24. A brake assembly according to claim 1 in which a torque tube is secured to a non-rotatable annular hub on which the plurality of brake actuators is mounted, a series of annular stator friction members being axially slidably mounted, each at its inner periphery, so as to engage splines on the torque tube, said friction members being interleaved by a corresponding series of rotor friction members axially slidably mounted and keyed, each at its radially outer periphery, to a wheel for rotation therewith, a reaction member in the form of a flange being secured to the end of the torque tube remote from the hub.

25. A brake assembly according to claim 24 wherein the reaction member is of a frusto-conical shape.

26. A disc brake according to claim 1 arranged for use as a clutch.

* * * * *